3,293,058
COATING COMPOSITIONS

Edward Michael Evans, Penarth, Valerie Lewis, Cardiff, and Howard Williams, Wenvoe, Wales, assignors to The Distillers Company Limited, Edinburgh, Scotland, a British company
No Drawing. Filed Dec. 17, 1962, Ser. No. 244,911
Claims priority, application Great Britain, Jan. 2, 1962, 89/62
12 Claims. (Cl. 106—253)

The present invention relates to improved water-dilutable, aqueous surface coating compositions.

By water-dilutable is meant that the aqueous surface coating composition, which may contain a water-miscible solvent such as isopropanol, can be diluted with water to produce aqueous paints or primers which can be applied directly to a surface to be protected.

The manufacture of water-dilutable, aqueous surface coating compositions by heating certain drying oils and the like, with an acyclic, olefinic acid or anhydride such as maleic anhydride and then reacting the oil/acid reaction product with an aqueous solution of a base, is known. For example see U.S. patent specification 2,414,712 and British patent specification 500,349. It has also been stated that such oil/acid reaction products, after further reaction with formaldehyde, produce unusually stable emulsions of the water-in-lacquer type.

It has now been found that in spite of the stated insolubility of the formaldehyde reaction products, it is nevertheless possible to form water-dilutable surface coating preparations from them. Moreover, these water-dilutable surface coating preparations can be used to provide water-soluble coating compositions which give rise to coatings having improved hardness and improved resistance to corrosion under humid conditions as compared with coatings derived directly from the oil/acid reaction products of the prior art.

According to the present invention the process for the production of an aqueous surface coating composition comprises reacting a compound functioning as an unsaturated oil with a compound having an available acyclic, olefinic carboxylic acid residue, both compounds as herein defined, to produce a water soluble oil/acid product, reacting the oil/acid product with formaldehyde and then dissolving the resultant product in an aqueous solution of a base.

By a compound functioning as an unsaturated oil is meant throughout this specification the oil itself which consists of or comprises a triglyceride ester of an unsaturated fatty acid having at least 12 carbon atoms in the carbon chain containing the unsaturation, or a derivative of such an unsaturated oil which acts as the oil itself. Examples of unsaturated oils are tung, oiticica, linseed, soya, cotton seed, dehydrated castor, perilla, tall and unsaturated fish oils. Examples of suitable derivatives of unsaturated oils are the fatty acids obtained from the oils and esters of such acids e.g. by the methyl or polyglycol esters.

By a compound having an available acyclic, olefinic carboxylic acid residue is meant throughout this specification the acids themselves and their simple derivatives including, in the case of polycarboxylic acids their anhydrides. The acids are defined as carboxylic acids having less than 10 carbon atoms in any carbon chain, no cyclic groups, and olefinic unsaturation. The preferred acids are dicarboxylic acids. Suitable acyclic, olefinic dicarboxylic acids are maleic acid, fumaric acid, aconitic acid, itaconic acid and alkyl-substituted maleic acids having less than ten carbon atoms in any uninterrupted carbon chain. A suitable acyclic, olefinic monocarboxylic acid is acrylic acid. Specific derivatives are citraconic anhydride and maleic acid partially esterfied with an aliphatic alcohol. Citric acid when subjected to the conditions under which citraconic anhydride or itaconic acid is produced (Bernthsen, Textbook of Organic Chemistry (1923) pages 250 to 256) can also be employed.

Maleic acid is the preferred acyclic, olefinic carboxylic acid and it is preferred to employ it in the form of maleic anhydride.

Minor amounts of synthetic and naturally occurring dienes such as cyclopentadiene, butadiene, cashew nut shell oil, gum rosin and myrcene, which react with the compound having an available acyclic, olefinic carboxylic acid residue by Diels Alder addition may be introduced to modify the reaction product of the oil and the carboxylic acid.

The compound functioning as the unsaturated oil and sufficient of the compound having an available acyclic, olefinic carboxylic acid residue are reacted together until a water-soluble product is obtained. By water-soluble is meant that the product dissolves in water containing a base, for example a soluble alkali metal hydroxide or an ammonia base of the class which consists of ammonia and primary, secondary and tertiary aliphatic amines.

The conditions for the reaction and the relative proportions of the reactants are known, e.g. British patent specification 500,349 or U.S. patent specification 2,414,712. Suitably the reaction is effected by heating the reactants together for an extended period of time at a temperature of at least 110° C. and commonly below 300° C. until the water-soluble product is obtained. When maleic anhydride is employed to react with linseed oil, the preferred reaction temperature is between 200 and 240° C. and the reaction is carried out under reflux conditions in order to return to the mixture any maleic anhydride which boils or sublimes off. Such reactions suitably employ 15 to 25% by weight maleic anhydride on the total weight of linseed oil and maleic anhydride.

The formaldehyde used in the process of the present invention can be introduced to the reaction mixture in various ways. For instance formalin (an aqueous solution of formaldehyde), paraformaldehyde (a low polymer of formaldehyde) or "flake" formaldehyde containing about 78% by weight of formaldehyde can be used. The form of the formaldehyde employed is preferably chosen so that it is soluble in the reaction mixture.

The proportion of formaldehyde present during the reaction with the oil/acid product can be varied widely. It is unnecessary to employ a weight of formaldehyde greater than about ⅕ of the weight of the oil/acid product because the excess formaldehyde appears in the surface coating composition as uncombined formaldehyde. Even small proportions of formaldehyde improve the surface coating characteristics of the oil/acid product. However, the preferred compositions are prepared by reacting the oil/acid product with from 1% to 10% by weight of formaldehyde.

The reaction of the formaldehyde and the oil/acid product can be carried out under substantially anhydrous conditions, but it is preferred to have water present in order to control the reaction and prevent gelation of the reaction mixture occurring. Most suitably the reaction mixture contains from 40% to 50% by weight of water.

It is observed that when the reaction of the oil/acid product and the formaldehyde is carried out in the presence of water, the viscosity of the reaction mixture falls as the reaction proceeds. This can be used as a guide to the progress of the reaction. The low viscosity of compositions according to the present invention facilitates their handling because resins of higher solids content can be produced with the result that less water has to be transported from the site of manufacture to the user.

The reaction of the formaldehyde and the oil/acid product can be effected by heating the ingredients together. When water is present this can be conveniently achieved by heating the mixture under reflux conditions. The reaction of formaldehyde and the oil/acid product can be carried out under acid or alkaline conditions for instance in the range 3.5 to 9.0. The preferred pH value being in the range 4.5–8.5.

The final step in the process of the present invention comprises dissolving the product obtained by reacting the oil/acid reaction product with formaldehyde in an aqueous solution of a base. If the formaldehyde reaction has been carried out in a reaction mixture having a pH value greater than 7, i.e. a reaction mixture to which a base has been added, there may be no need to add any further base in order to obtain a composition according to the present invention. If the formaldehyde reaction is carried out in an aqueous medium at an alkaline pH value, the resultant reaction mixture is a composition according to the present invention since the product of the formaldehyde reaction is dissolved in the aqueous reaction medium as it is formed. A water miscible solvent such as isopropanol may be added to the final composition in order to increase the solubility of the solid products therein. The solubility of these solid products also increases as the pH value of the composition is raised.

Preferably the amount of base present is such that the aqueous surface coating composition has an approximately neutral or slightly alkaline pH value. Suitably the water-dilutable aqueous surface coating compositions have a pH value in the range 7.2 to 8.0 although values as high as 9.5 or even higher can be used in some cases. Examples of suitable bases are the soluble alkali metal hydroxides and the ammonia bases, i.e. ammonia and primary, secondary and tertiary aliphatic amines. A volatile base such as ammonia is preferred because it is to a large extent driven off with the evaporation of water (and any other solvent present) during the formation of the surface coating film.

Preferably the aqueous surface coating compositions according to the present invention are diluted with water before being used to coat surfaces, so that their concentration is in the range from 15 to 60 grams of resinous material per 100 millilitres of liquid. Compositions having a concentration outside this range are sometimes useful for special purposes; for example, aqueous compositions of higher concentration may be usefully employed after addition of a water-miscible organic solvent to reduce viscosity to a practical level.

The compositions (after dilution as necessary) can be applied to surface of many types in order to form a hard, resistant surface coating thereon. The compositions are particularly useful in the surface coating of metals.

The film formed on the surface as the water and any other solvent evaporate is relatively soft and can be brought into its final hard state by the action of heat. The conditions under which such curing is brought about are not critical, and long curing times at relatively low temperatures or short curing times at relatively high temperatures can be employed. For example the curing is often most suitably carried out by heating the film to a temperature between 110° and 200° C. for periods ranging from 15 minutes to 60 minutes. Alternatively a very brief heating period, e.g. from 1 to 5 minutes at higher temperatures, e.g. 200 to 250° C. is sometimes advantageous.

The cured films formed from the surface coating compositions of the present invention are generally clear and hard, having a high impact strength and good flexibility. It is usual for these compositions to be used in conjunction with pigments in the form of paints. Metal panels coated with these cured paints show high resistance to corrosion under humid conditions.

The following examples illustrate the production of aqueous surface coating compositions according to the present invention and their conversion into hard, resistant surface coatings. Water tolerance of a preparation is defined as the number of millilitres of water which may be added to 10 grams of the preparation at 25° C., before immediate cloudiness is observed. The parts referred to are by weight.

*Example 1.—Water-solubilised linseed oil/maleic anhydride reaction product*

76 parts of linseed oil and 24 parts of maleic anhydride are placed in a round bottomed reaction vessel fitted with a reflux condenser, thermometer and mechanical stirrer. The mixture is heated at 220° C., for from 5 to 8 hours under an atmosphere of nitrogen and then cooled.

150 parts of the maleinised oil are then mixed with 100 parts of water and 39.6 parts of 36% formalin. The mixture is held under reflux conditions for several hours and finally the pH value is adjusted from about 4.5 to between 7.2 and 7.6 by addition of ammonia. During the reaction the viscosity of the reaction mixture (tested after solubilisation with ammonia) decreases, i.e. it was 150 stokes after 1 hour reflux, 70 stokes after 3 hours and 20 stokes after 12 hours. The clear aqueous composition according to the present invention thus produced having a non-volatile content of about 49% can be used directly after the addition of 0.06 part (as cobalt metal) of a cobalt drier to a composition containing 100 parts of solvent free resin. Hard, clear flexible surface coatings are produced therefrom by stoving the wet film for 30 minutes at 150° C.

The film is considerably harder than the film obtained directly from the maleinised oil without reaction with formaldehyde and containing the same amounts of cobalt drier.

The viscosity of a composition as prepared in this example at a solids content of 45% is in the range 8–10 stokes at 25° C. By way of contrast the viscosity of a similar composition prepared from linseed oil and maleic anhydride without reaction with formaldehyde was 60 to 80 stokes at 25° C. at a solids content of 45%.

*Example 2*

Repetition of Example 1 but using less water so that the non-volatile content of the reaction mixture is about 55% gave a composition having a water tolerance of 1.0. However, if isopropanol is added so that the non-volatile content drops to 45% the resultant composition can be diluted infinitely with water. Similarly raising the pH value of the composition to 7.8 by the addition of aqueous ammonia gives a composition that can be diluted infinitely with water.

Films were prepared from the composition containing isopropanol after the addition of a cobalt drier and then they were stoved for half an hour at 150° C. Comparative, similarly stoved films were prepared from a similar composition of the same solids content derived from the linseed oil/maleic anhydride reaction product without reaction with any formaldehyde. Examination of the hardness of the films immediately after stoving showed that the films formed from compositions according to the present invention were much tougher and harder than the comparative films. 18 hours after stoving the hardness of the films was tested by the Sward rocker hardness method (Physical and Chemical Examination of Paints, Varnishes, Lacquers and Colours—Gardner and Sward, 12th edition, 1962, p. 138) with the following results:

| Films tested: | Hardness results |
|---|---|
| Films according to invention | 22, 20, 28, 26 |
| Comparative films | 16, 16, 11, 11 |

The above films when applied to steel panels gave excellent protection against corrosion when tested for 400 hours in a corrosive atmosphere.

Example 3

Repetition of Example 1 at a non-volatile content of 73% gave an aqueous solution which, on dilution with isopropanol to a non-volatile content of 50%, was infinitely dilutable with water. The pH value of the undiluted aqueous solution was 7.3. If this was raised to 7.8 by the addition of aqueous ammonia the resultant solution was infinitely dilutable with water.

Example 4

The maleinised oil of Example 1 was mixed with paraformaldehyde in the weight ratio of maleinised oil/formaldehyde of 10:1. The mixture was heated at 100° C. for 1 hour and then water and ammonia added to give a solution having a pH value of 7.4 and a non-volatile content of 65%. This solution had an infinite water tolerance. A cobalt drier was added and hard, cured surface coatings were produced as described in Example 1. They had similar properties to those described in Example 1.

Example 5

150 parts of the maleinised oil of Example 1 were mixed with 100 parts of water and 39.6 parts of 36% formalin. The pH value of the mixture was adjusted to between 7.5 and 8.0 with ammonia. The mixture was then held at reflux for several hours.

After 3 hours a clear preparation solution was obtained which had a non-volatile content of 48.0%, a viscosity of 52 stokes and a pH value of 7.8. The water tolerance was infinite. After addition of a cobalt drier cured surface coatings were produced as described in Example 1.

Example 6

131.6 parts of the maleinised oil of Example 1 were mixed with 54.6 parts water and refluxed for 15 minutes. A further 22.7 parts of water were added and sufficient aqueous ammonia to produce a clear solution having a pH value of between 7.2 to 7.6. 180 parts of this solution were mixed with 10 parts of Paraform Flake (78% formaldehyde) and sufficient ammonia to bring the pH value of the mixture to about 8.5. The mixture was held at reflux for 4 hours at the end of which time a surface coating composition was obtained having a pH of 8.6, a non-volatile content of 46.0% and a viscosity of 2.7 stokes. The water tolerance was again infinite.

In Examples 3 to 6 the products all gave films which on stoving are harder than films laid with an unmodified maleinised oil and containing the same amount of cobalt driers.

Example 7

880 parts of tung oil was reacted with 174 parts of fumaric acid at 200° C. for 1 hour. 250 parts of aqueous formaldehyde (36% w/w concentration) was added and the reactants held at reflux for 5 hours before ammonia was added to a pH value of reaction mixture between 9.0–9.5 to solubilise the product. The resultant composition which was infinitely water dilutable gave rise to cured films having properties superior to those of films derived from the unmodified tung oil/fumaric acid reaction product.

Examples 8–13

A series of maleic anhydride/linseed oil reaction products were made by the process described in Example 1 except that the proportion of maleic anhydride employed was varied. These reaction products were then refluxed with formalin (36%) in a proportion of 1 mole maleinised linseed oil to 3 moles of formaldehyde for five hours after which time ammonia was added together with 8% of isobutanol to solubilise the product. The characteristics of the resultant compositions are given in the following table:

| Example | Parts of MA per 100 parts oil | MA Content of MLO (percent) | Parts formalin per 100 parts oil | Solid content, percent | pH | Visc. (Stokes) at 25° C. | Water Tolerance |
|---|---|---|---|---|---|---|---|
| 8 | 13.6 | 12 | 30.0 | 55.0 | 8.4 | 1.7 | Infinite. |
| 9 | 17.7 | 15 | 31.0 | 55.0 | 8.0 | 2.7 | Do. |
| 10 | 25.0 | 20 | 32.9 | 56.0 | 8.15 | 9.1 | Do. |
| 11 | 31.6 | 24 | 34.8 | 55.5 | 8.2 | 9.3 | Do. |
| 12 | 42.9 | 30 | 37.8 | 56.0 | 7.2 | 22.0 | Do. |
| 13 | 53.9 | 35 | 40.5 | 53.4 | 7.4 | 17.5 | Do. |

MA = maleic anhydride.
MLO = Linseed oil/maleic anhydride reaction product.

All compositions gave rise to stoved films which were clear and glossy. The degree of hardness increased with increasing maleic acid content.

Paints, primers and the like can readily be formed from solutions of compositions according to the present invention using conventional paint mixing machinery, e.g. roll mills and ball mills. Formulation is essentially similar to that of known aqueous systems except that reactive pigments such as zinc oxide, zinc chromate, white lead and any other pigment or extender containing soluble salts, are preferably not used. Also materials containing soluble salts of metals such as barium, calcium and zinc are preferably avoided since they will react with the resin causing viscosity increase and giving poor storage stability. Suitable compatible pigments include titanium dioxide, red oxide or iron, strontium chromate, lead silico chromate, carbon black and antimony oxide. Extenders which can be used with the composition solution include barytes, Blanc Fixe (certain grades), talc and mica. Micronised pigments and extenders are very suitable for inclusion in formulations when paints of low viscosity and film build are required.

In the following description of typical formulations, formulation 1 is that of a typical red oxide primer, formulation 2 that of a typical grey primer surfacer and formulation 3 that of a black dipping eggshell finish.

Formulation 1:                                       Parts by weight
  Composition solution of Example 11 _____ 37.1
  Lead silico chromate _____ 1.9
  Natural red oxide _____ 19.4
  Barytes _____ 12.0
  Norwegian talc _____ 3.9
  Ben-A-Gel (magnesium montmorillonite) ____ 0.2
  Ammonia (to pH 9) _____ 0.9
  Water _____ 24.6

Formulation 2:
  Example 11 _____ 32.4
  Lead silico chromate _____ 1.4
  Titanium dioxide _____ 13.4
  Barytes _____ 13.8
  Asbestine _____ 3.6
  Norwegian talc _____ 4.4
  Ben-A-Gel (magnesium montmorillonite) ____ 0.4
  Ammonia (to pH 9) _____ 0.9
  Water _____ 29.7

Formulation 3:
  Example 11 _____ 44.5
  Carbon black _____ 1.4
  Diatomaceous earth _____ 1.4
  China clay _____ 5.1
  Barytes _____ 12.3
  Water _____ 35.3

The characteristics of these formulations are given in the following table:

| Formulation | 1 | 2 | 3 |
|---|---|---|---|
| Viscosity at 25° C. using B.S. 1733 Type B4 Cup (seconds) | 90 | 90 | 30 |
| Non-volatile content, percent | 57.8 | 54.9 | 44.7 |
| Pigment: Resin ratio | 1.83:1 | 2.07:1 | 0.8:1 |
| Pigment volume concentration, percent | 33.6 | 35.8 | 20.7 |
| Weight/gallon/lbs | 14.3 | 15 | 11.5 |
| Resin concentration in total water weight, percent | 33 | 29 | 30 |

Surface coating compositions according to the present invention find many applications including the coating of metal toys, metal furniture, iron drain pipes, steel strip direct from the hot mill, domestic appliances, lighting fittings, cycles and motor cycles, lawn mowers and horticultural equipment, ammunition, transformers, and electric motor core stampings, hot water radiators, metal window frames, electric motor housings, fan blades and metal canisters.

We claim:

1. A process for producing an aqueous surface coating composition which comprises reacting (1) a member selected from the group consisting of triglyceride ester of unsaturated fatty acid having at least 12 carbon atoms, fatty acid having at least 12 carbon atoms, and the methyl and polyglycol esters of fatty acids having at least 12 carbon atoms, with (2) a member selected from the group consisting of acyclic olefinic carboxylic acid having less than ten carbon atoms in any chain, acyclic olefinic polycarboxylic acid aliphatic ester having less than ten carbon atoms in any carbon chain, and acyclic olefinic polycarboxylic acid anhydride having less than ten carbon atoms in any carbon chain, at a temperature above 110° C. until a water soluble oil/acid product is formed, reacting said water soluble product with from 1% to 10% by weight of formaldehyde in a reaction medium having a pH of about 3.5 to 9 and then dissolving the resultant product in an aqueous solution of a base.

2. A process for producing an aqueous surface coating composition which comprises reacting linseed oil with maleic anhydride at a temperature of at least 110° C. until a water soluble oil/acid product is formed, reacting said water soluble product with from 1% to 10% by weight of formaldehyde in a reaction medium having a pH of about 4.5 to 8.5 and then dissolving the resultant product in an aqueous solution of a base.

3. A process according to claim 1 wherein the reaction between the water soluble oil/acid product and formaldehyde is conducted in an aqueous alkaline solution having a pH greater than 7, whereby the resultant product is dissolved in situ in said aqueous alkaline solution.

4. A process as claimed in claim 1 wherein reactant (1) is a member of the group consisting of linseed oil and the linseed oil fatty acids.

5. A process as claimed in claim 1 wherein reactant (2) is maleic anhydride.

6. A process as claimed in claim 1 wherein the weight of the reactant (2) is from 15 to 25% by weight of the total weight of reactants (1) and (2).

7. A process as claimed in claim 1 wherein the reaction with formaldehyde is carried out in a reaction mixture which contains from 40% to 50% by weight of water.

8. A process as claimed in claim 1 wherein the reaction of the oil/acid product and formaldehyde is carried out with the pH value of the reaction mixture in the range 4.5 to 8.5.

9. A process as claimed in claim 1 wherein the pH value of the aqueous surface coating composition lies in the range 7.2 to 8.0.

10. A process as claimed in claim 1 wherein the base is ammonia.

11. An aqueous surface coating composition comprising a solution in an aqueous base of the reaction product of formaldehyde and the water soluble product obtained by reacting (1) a member selected from the group consisting of triglyceride ester of unsaturated fatty acid having at least 12 carbon atoms, fatty acid having at least 12 carbon atoms, and the methyl and polyglycol esters of fatty acids having at least 12 carbon atoms, with (2) a member selected from the group consisting of acrylic olefinic carboxylic acid having less than ten carbon atoms in any chain, acyclic olefinic polycarboxylic acid aliphatic ester having less than ten carbon atoms in any carbon chain, and acyclic olefinic polycarboxylic acid anhydride having less than ten carbon atoms in any carbon chain, at a temperature above 110° C.

12. A pigmented surface coating formulation comprising a compatible water dispersible pigment and an aqueous surface coating composition as claimed in claim 11.

References Cited by the Examiner

UNITED STATES PATENTS

| | | | |
|---|---|---|---|
| 2,005,499 | 6/1935 | Hill. | |
| 2,311,781 | 2/1943 | Scrutchfield | 260—101 |
| 2,331,805 | 10/1943 | Scrutchfield | 260—101 |
| 2,414,712 | 1/1947 | Sheldon | 106—250 |
| 2,935,417 | 5/1960 | Biskup et al. | 106—252 |
| 3,123,578 | 3/1964 | Kraft | 260—22 |
| 3,180,750 | 3/1965 | Shippee et al. | 260—29.4 |

FOREIGN PATENTS 903,774    8/1962   Great Britain.

ALEXANDER H. BRODMERKEL, *Primary Examiner.*

MORRIS LIEBMAN, *Examiner.*

J. B. EVANS, *Assistant Examiner.*